US011188991B2

(12) United States Patent
Kelton et al.

(10) Patent No.: US 11,188,991 B2
(45) Date of Patent: Nov. 30, 2021

(54) REAL ESTATE ADVISOR ENGINE ON COGNITIVE SYSTEM

(71) Applicant: International Business Machines Corporation, Armonk, NY (US)

(72) Inventors: Eugene I. Kelton, Mechanicsburg, PA (US); Willie R. Patten, Jr., Hurdle Mills, NC (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 16/784,975

(22) Filed: Feb. 7, 2020

(65) Prior Publication Data

US 2021/0248697 A1    Aug. 12, 2021

(51) Int. Cl.
*G06Q 30/00* (2012.01)
*G06Q 50/16* (2012.01)
*G06Q 30/06* (2012.01)
*G06N 20/00* (2019.01)

(52) U.S. Cl.
CPC ......... *G06Q 50/16* (2013.01); *G06Q 30/0627* (2013.01); *G06N 20/00* (2019.01)

(58) Field of Classification Search
None
See application file for complete search history.

(56) References Cited

U.S. PATENT DOCUMENTS

| 5,032,989 A | 7/1991 | Tornetta |
| 5,664,115 A | 9/1997 | Fraser |
| 6,594,633 B1 | 7/2003 | Broerman |
| 6,684,196 B1 | 1/2004 | Mini et al. |
| 6,701,311 B2 | 3/2004 | Biebesheimer et al. |

(Continued)

FOREIGN PATENT DOCUMENTS

| DE | 102014113870 A1 | 6/2015 |
| WO | 2010108231 A1 | 9/2010 |
| WO | 2019033090 A1 | 2/2019 |

OTHER PUBLICATIONS

The Land Registry in the blockchain—testbed; "Kairos Future" (Mar. 2017).

(Continued)

*Primary Examiner* — Mila Airapetian
(74) *Attorney, Agent, or Firm* — Troutman Pepper Hamilton Sanders LLP

(57) ABSTRACT

Embodiments can provide a computer implemented method for identifying a match between a commercial buyer and a seller for a real estate transaction. The method includes receiving, from the buyer, a service request and receiving, from the buyer, historical information stored in a buyer immutable record. The method also includes receiving one or more real estate requirements and one or more commercial external factors and determining a buyer need profile based on the historical information, the real estate requirements, and the commercial external factors. The method also includes receiving one or more answers in response to one or more first questions raised by the processor, refining the buyer need profile based on the one or more answers, identifying a match between the buyer need profile and a real estate profile from the seller, and providing a ranked list of real estate properties and supporting evidence for each real estate property to the buyer.

18 Claims, 7 Drawing Sheets

(56) References Cited

U.S. PATENT DOCUMENTS

| | | |
|---|---|---|
| 7,158,956 B1 | 1/2007 | Himmelstein |
| 8,775,322 B2 | 7/2014 | Heyer |
| 9,230,009 B2 | 1/2016 | Alkov et al. |
| 9,514,124 B2 | 12/2016 | Allen et al. |
| 2002/0052814 A1 | 5/2002 | Ketterer |
| 2004/0030631 A1 | 2/2004 | Brown et al. |
| 2005/0288958 A1 | 12/2005 | Eraker et al. |
| 2007/0244798 A1* | 10/2007 | Weidenbenner ....... G06Q 30/02 705/37 |
| 2012/0301864 A1 | 11/2012 | Bagchi et al. |
| 2014/0297571 A1 | 10/2014 | Beamon et al. |
| 2014/0298199 A1 | 10/2014 | Johnson et al. |
| 2014/0358928 A1 | 12/2014 | Alkov et al. |
| 2015/0269139 A1 | 9/2015 | McAteer et al. |
| 2015/0310371 A1 | 10/2015 | Byrne et al. |
| 2015/0356203 A1 | 12/2015 | Allen et al. |
| 2016/0012335 A1 | 1/2016 | Bufe et al. |
| 2016/0048772 A1 | 2/2016 | Bruno et al. |
| 2016/0110501 A1 | 4/2016 | Allen et al. |
| 2016/0117485 A1 | 4/2016 | Allen et al. |
| 2016/0134649 A1 | 5/2016 | Allen et al. |
| 2016/0170968 A1 | 6/2016 | Allen et al. |
| 2016/0196265 A1 | 7/2016 | Allen et al. |
| 2016/0196313 A1 | 7/2016 | Allen et al. |
| 2016/0196336 A1 | 7/2016 | Allen et al. |
| 2016/0196490 A1 | 7/2016 | Chandrasekaran et al. |
| 2016/0342886 A1 | 11/2016 | Allen et al. |
| 2017/0116691 A1 | 4/2017 | Syiau |
| 2018/0018723 A1 | 1/2018 | Nagla et al. |
| 2018/0253780 A1* | 9/2018 | Wang ...................... H04L 51/02 |
| 2018/0322597 A1 | 11/2018 | Sher |
| 2019/0073729 A1 | 3/2019 | Cheng-Shorland et al. |

OTHER PUBLICATIONS

Gershgorn, Dave. "AN AI can use Google Street View to help you decide where to move." Quartz. Feb. 8, 2017/.

* cited by examiner

REAL ESTATE ADVISOR ENGINE ON COGNITIVE SYSTEM

TECHNICAL FIELD

The present invention relates generally to a cognitive system implementing a real estate advisor engine for a real estate transaction, and more particularly to implementing a real estate advisor engine that identifies a match between a buyer and a seller.

BACKGROUND

Generally, real estate buyers use different real estate searching systems, such as Zillow, Trulia, and the like, to research real estate availability in a desired geographic area and attempt to match to their needs. This transaction model is flawed for consumers, both buyers and sellers, in that the current real estate searching systems manage the flow of information through a multiple listing service (MLS) and local real estate brokers.

With the current real estate transaction model, much of the leverage resides in brokers, rather than buyers and sellers. This real estate transaction model produces a flawed and inefficient system, in which the buyers are uncertain whether they can get what they expect or even what they have been informed by the brokers. Furthermore, the sellers always know little about the potential buyers of their properties. Additionally, the current real estate searching systems provide limited real estate information, thus requiring a lot of information analysis. As a result, the analysis result may become rather subjective due to time constraints.

A new real estate transaction model, which can provide information to both sellers and buyers, and easily identify a match between a buyer and a seller, is desired.

SUMMARY

Embodiments provide a computer implemented method for identifying a match between a commercial buyer and a seller for a real estate transaction, the system comprising a processor and a memory comprising instructions executed by the processor, the method comprising: receiving, from the commercial buyer, a service request; receiving, from the commercial buyer, historical information stored in a buyer immutable record including one or more of revenue, expenses, bond rating, a market saturation level, sales volume, sold products, employee number, and certifications; receiving, from the commercial buyer, one or more real estate requirements; receiving, from the commercial buyer, one or more commercial external factors including one or more of an industry, a customer base, and a supply chain; determining, by the processor, a buyer need profile based on the historical information, the real estate requirements, and the commercial external factors; receiving, from the commercial buyer, one or more answers in response to one or more first questions raised by the processor; refining, by the processor, the buyer need profile based on the one or more answers; identifying, by the processor, a match between the buyer need profile and an available real estate profile from the seller; and providing, by the processor, a ranked list of real estate properties and supporting evidence for each real estate property to the commercial buyer.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a training data harvesting processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
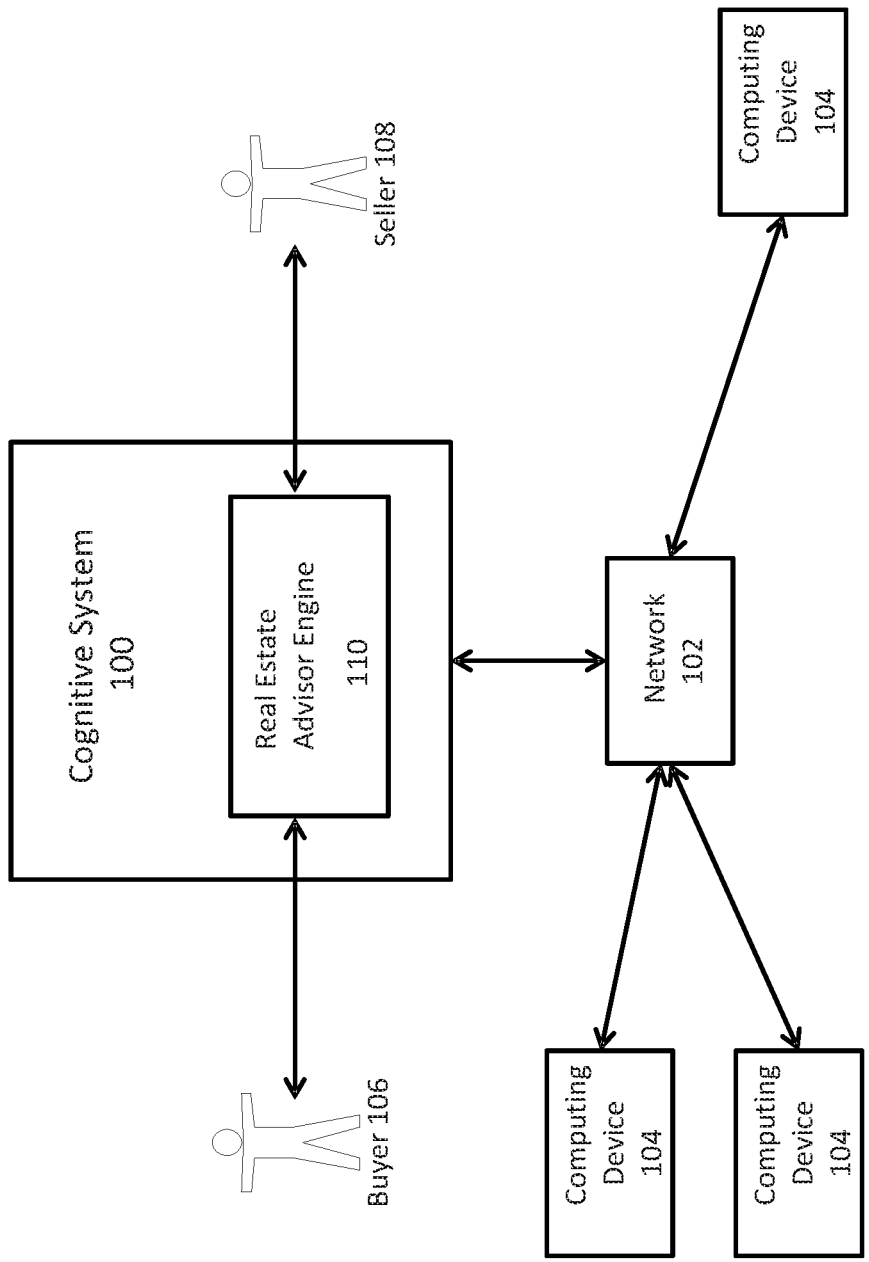
FIG. 1 depicts a schematic diagram of one illustrative embodiment of a cognitive system 100 implementing a real estate advisor engine 110.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ available from International Business Machines Corporation is an example of one such cognitive system which can process human readable language and identify inferences between text passages with human-like accuracy at speeds far faster than human beings and on a much larger scale. In general, such cognitive systems are able to perform the following functions:

Navigate the complexities of human language and understanding

Ingest and process vast amounts of structured and unstructured data

Generate and evaluate hypotheses

Weigh and evaluate responses that are based only on relevant evidence

Provide situation-specific advice, insights, and guidance
Improve knowledge and learn with each iteration and interaction through machine learning processes
Enable decision making at the point of impact (contextual guidance)
Scale in proportion to the task
Extend and magnify human expertise and cognition
Identify resonating, human-like attributes and traits from natural language
Deduce various language specific or agnostic attributes from natural language
High degree of relevant recollection from data points (images, text, voice) (memorization and recall)
Predict and sense with situation awareness that mimics human cognition based on experiences
Answer questions based on natural language and specific evidence In one aspect, the cognitive system can be augmented with a real estate advisor engine. The real estate advisor engine collects information of a buyer immutable record and a real estate immutable record, and identifies a best match between a buyer and a seller. In an embodiment, if the buyer is a residential buyer or an individual, the buyer immutable record can include a purchasing record (i.e., any purchases including but not limited to a property purchase), an education record (e.g., highest degree), a social networking record (friend relationship; family relationship; community involvement, e.g., an association membership, church, etc.), a preference record (e.g., luxury preference, or cost performance preference, etc.; hobbies), family information (e.g., married/divorced, children and ages, etc.), socioeconomic data (e.g., salary, employment, etc.), and the like. In an embodiment, if the buyer is a commercial buyer, then the buyer immutable record can include revenue, expenses, bond rating, and market saturation level, etc.

The real estate immutable record can include sales history, repair history (e.g., a new furnace installed in 2015, driveway repair, etc.), service history (e.g., pest mitigation, mold mitigation, fire restoration, flood restoration, etc.), insurance history (e.g., insurance purchase, insurance claims, etc.), governmental impact history (e.g., taxes, etc.), environmental history (e.g., flood, tornado, etc.), property facts (e.g., size and layout of the property, etc.), and the like.

In an embodiment, the buyer immutable record and the real estate immutable record are stored in a storage device, a remote server, or cloud storage. In an embodiment, e.g., the buyer immutable record and the real estate immutable record can be stored in a block chain. A block chain is a growing list of blocks, that are linked using cryptography. Each block contains a cryptographic hash of the previous block, a timestamp, and record data. A block chain is resistant to modification of the data. The buyer immutable record and the real estate immutable record include verifiable buyer information and real estate information respectively, and thus the buyer immutable record and the real estate immutable record are resistant to modification of the record data by regular users. The buyer immutable record and the real estate immutable record can only be updated via a privileged record keeper if the updated information is verified. For example, if the property is newly sold, the sales history of the real estate immutable record will be updated. For another example, if a roof of the property is newly replaced, the repair history of the real estate immutable record will be updated.

The real estate advisor engine provides results of a cognitive scoring analysis for the buyer immutable record and real estate immutable record. In an embodiment, all available data, including structured data and unstructured data, are leveraged to make a best fit recommendation with supporting evidence. For example, a ranked list of buyers are recommended to a seller, with supporting evidence of the recommendation. For another example, a ranked list of real estate properties to be sold are recommended to a buyer, with supporting evidence of the recommendation. In an embodiment, the buyer immutable record and the real estate immutable record stored in a block chain are continuously updated to reflect an accurate real estate environment. For example, new real estate property information may be added in the real estate advisor engine. New buyer information may be added in the real estate advisor engine. If an existing property is sold, then the status of that property will be updated.

In an embodiment, the parties (buyers, sellers) do not have direct access to each other's immutable records. Instead, the real estate advisor engine has access to both immutable records and identifies a match between the two parties based on the immutable records. For example, the real estate advisor engine can provide a list of ranked properties for a buyer, each property having a different score and a piece of supporting evidence indicating why this property is chosen for this buyer. For another example, the real estate advisor engine can provide a list of ranked buyer candidates for a real estate property, each buyer candidate having a different score and a piece of supporting evidence indicating why this buyer candidate is chosen for this real estate property.

In an embodiment, the buyer immutable record and the real estate immutable record can be mandated by the government (federal, state, or local). In another embodiment, the buyer immutable record can also be mandated by buyers themselves seeking to get full knowledge on specific properties.

In an embodiment, the real estate immutable record includes property transactions, sales history, repair history, services history, insurance history (insurance purchase, claims, etc.), governmental impact history (taxes, etc.), environmental history (local issues such as flood, tornado, etc.), etc. In an embodiment, relevant property transactions are stored in the real estate immutable record owned by the property, instead of a property owner. The cumulative record of the property includes, for example, prior owner transaction history and current owner transaction information.

FIG. 1 depicts a schematic diagram of one illustrative embodiment of a cognitive system 100 implementing a real estate advisor engine 110 in a computer network 102. The cognitive system 100 is implemented on one or more computing devices 104 (comprising one or more processors and one or more memories, and potentially any other computing device elements generally known in the art including buses, storage devices, communication interfaces, and the like) connected to the computer network 102. The computer network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and the computer network 102 enable real estate advisor engine 110 functionality for one or more cognitive system users via their respective computing devices. Other embodiments of the cognitive system 100 may be used with components, systems, sub-systems, and/or devices other than those that are depicted herein. The computer network 102 includes local network connections and remote connections in various embodiments, such that the cognitive system 100 may operate in environments of any size, including local and global, e.g., the Internet.

The cognitive system 100 is configured to implement a trained real estate advisor engine 110 that receive inputs from buyers 106 and sellers 108. The real estate advisor engine 110 can identify a best match between a buyer 106 and a seller 108 based on the information regarding the buyer 106 and a real estate property of the seller 108. For example, the real estate advisor engine 110 can provide a list of ranked properties for the buyer 106, each property having a different score and a piece of supporting evidence indicating why this property is chosen for the buyer 106. For instance, supporting evidence can be "this property is close to a lake, because the buyer requires a waterway." For another example, the real estate advisor engine 110 can provide a list of ranked buyer candidates for a real estate property of the seller 108, each buyer candidate having a different score and a piece of supporting evidence indicating why this buyer candidate is chosen for the real estate property of the seller 108. For instance, supporting evidence can be "this buyer candidate has four children, and is fit for the five-bedroom property."

Figure 2:
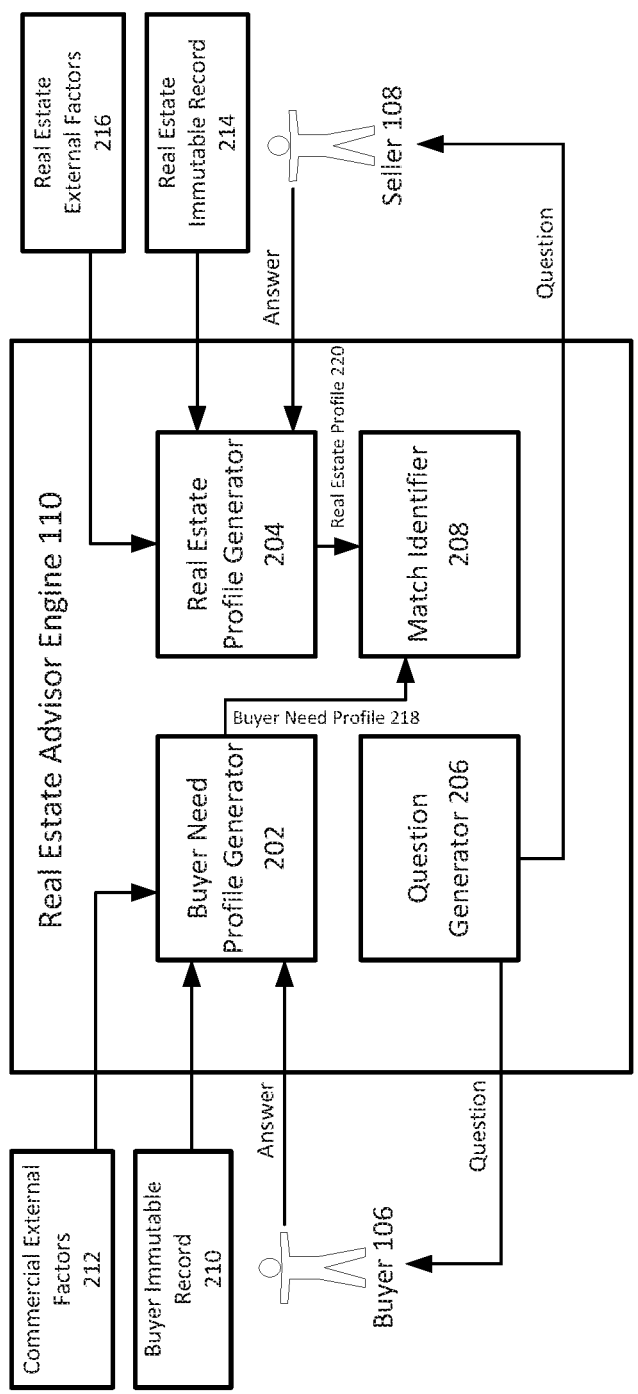
FIG. 2 depicts a schematic diagram of one illustrative embodiment of the real estate advisor engine 110.

FIG. 2 depicts a schematic diagram of one illustrative embodiment of the real estate advisor engine 110. As shown in FIG. 2, the real estate advisor engine 110 includes buyer need profile generator 202, real estate profile generator 204, question generator 206, and match identifier 208. The question generator 206 can generate questions to the buyer 106 and the seller 108 respectively. The answers from the buyer 106 and the seller 108 are respectively received by the buyer need profile generator 202 and the real estate profile generator 204. In an embodiment, the buyer need profile generator 202 further receives data from the buyer immutable record 210. The buyer 106 can be a residential buyer or a commercial buyer. If the buyer 106 is a residential buyer, the buyer immutable record 210 can include a purchasing record, an education record, a social networking record, and a preference record, etc. If the buyer 106 is a commercial buyer, the buyer immutable record 210 can include sales volume, sold products, employee number, and certifications, etc. of the commercial buyer. If the buyer 106 is a commercial buyer, the buyer need profile generator 202 may further receive data from the commercial external factors 212. The commercial external factors 212 may include industry, customer base (e.g., Fortune "500" companies, medium-sized companies, small companies, or individuals), supply chain (e.g., vendors), etc. of the commercial buyer. In another embodiment, the real estate profile generator 204 further receives data from the real estate immutable record 214 and the real estate external factors 216. The real estate immutable record 214 can include property transactions, sales history, repair history, services history, insurance history, governmental impact history, environmental history, etc. The real estate external factors 216 can include a school (e.g., school rating corresponding to the real estate property), economics (e.g., salary scope of neighborhood), night life (e.g., bars, night clubs, restaurant, entertainment), infrastructure (e.g., transportation, roads, sewers, water supply, electrical grids, telecommunications such as mobile signal, parks, cemetery), crime rate, retail (e.g., supermarkets, outlets, shopping malls), local regulations, etc. The real estate external factors 216 can be obtained from different sources, such as multiple listing service (MLS), LexisNexis® community crime map, City-Data, etc.

In an embodiment, the buyer need profile generator 202 can generate buyer need profile 218 based on all the received data, including answers from the buyer 106, the buyer immutable record 210, and the optional commercial external factors 212. The real estate profile generator 204 can generate real estate profile 220 based on all the received data, including answers from the seller 108, the real estate immutable record 214, and the real estate external factors 216. The match identifier 208 can identify a match between the buyer need profile 218 and the real estate profile 220 using existing supervised machine learning techniques, e.g., linear regression, logistic regression, multi-class classification, decision trees or/and support vector machine, etc. For example, the real estate advisor engine 110 can provide a list of ranked properties for the buyer 106, each property having a different confidence score and a piece of supporting evidence indicating why this property is chosen for the buyer 106. For another example, the real estate advisor engine 110 can provide a list of ranked buyer candidates for a real estate property of the seller 108, each buyer candidate having a different confidence score and a piece of supporting evidence indicating why this buyer candidate is chosen for the real estate property of the seller 108.

Each reasoning algorithm of the machine learning generates a score based on the analysis it performs which indicates a measure of relevance of each factor. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching. A large number of scores generated by the various reasoning algorithms are synthesized into a confidence score for each buyer candidate or each property. This process involves applying weights to the various scores, where the weights have been determined through training of the statistical model employed by the real estate advisor engine 110 and/or dynamically updated. For example, the weights for scores of factors stored in the two immutable records may be set relatively higher than that of external factors, because the data of two immutable records is verifiable and cannot be modified by the buyer 106 or the seller 108. The weighted scores are processed in accordance with a statistical model generated through training of the real estate advisor engine 110 that identifies a manner by which these scores may be combined to generate a confidence score for each buyer candidate or property. This confidence score summarizes the level of confidence that the real estate advisor engine 110 has about the evidence that the buyer candidate or property is a match for the seller 108 or the buyer 106. A list of ranked real estate properties for the buyer 106, and a list of ranked buyer candidates for a real estate property of the seller 108 are provided based on the confidence score of each property or buyer candidate.

Figure 3:
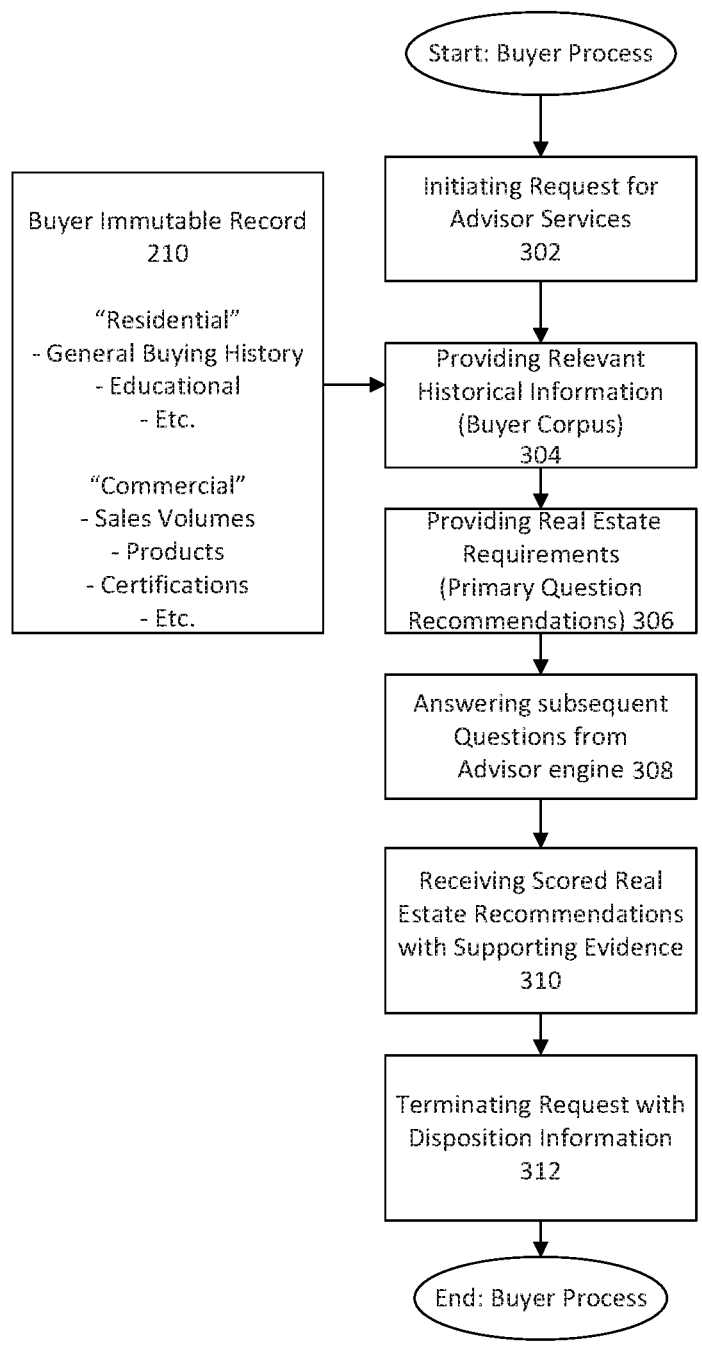
FIG. 3 illustrates a flow chart of one illustrative embodiment of a process of a buyer.

FIG. 3 illustrates a flow chart of one illustrative embodiment of a process of the buyer 106. As shown in FIG. 3, at step 302, the buyer 106 initiates a request for real estate advisor engine 110 service, so that the buyer 106 can get a list of matched properties. At step 304, the buyer 106 provides historical information to the real estate advisor engine 110. The historical information is obtained from the buyer immutable record 210. In an embodiment, the historical information can be stored in a buyer corpus, so that the real estate advisor engine 110 can obtain the historical information from the buyer corpus.

At step 306, the buyer 106 provides real estate requirements to the real estate advisor engine 110. In an embodiment, the real estate requirements, e.g., the size of the property, the number of bedrooms, tax threshold, etc. are directly provided to the real estate advisor engine 110. In another embodiment, the real estate requirements can be provided through questions. For example, the buyer 106 raises the question "[w]hat home is my best choice for my relocation to Raleigh?" From the question, the real estate advisor engine 110 can extract location requirement "Raleigh." At step 308, the real estate advisor engine 110 raises questions to the buyer 106, and the buyer 106 answers the questions. In an embodiment, the questions can be raised to the buyer 106 through text-to-speech technology. In another embodiment, the questions can be raised to the buyer 106 through a user interface, or an email, etc. At step 310, the buyer 106 receives a ranked list of real estate properties with supporting evidence. Each real estate property in the ranked list is provided with a confidence score, and supporting evidence why this property is selected. At step 312, the buyer 106 terminates the request, and provides disposition information, i.e., decision or opinion regarding the properties to the real estate advisor engine 110. For example, the buyer 106 may select one or more properties from the ranked list, and notify the real estate advisor engine 110 of the selection. For another example, the buyer 106 may be unsatisfied with the ranked list, and thus request the real estate advisor engine 110 to update the result.

Figure 4:
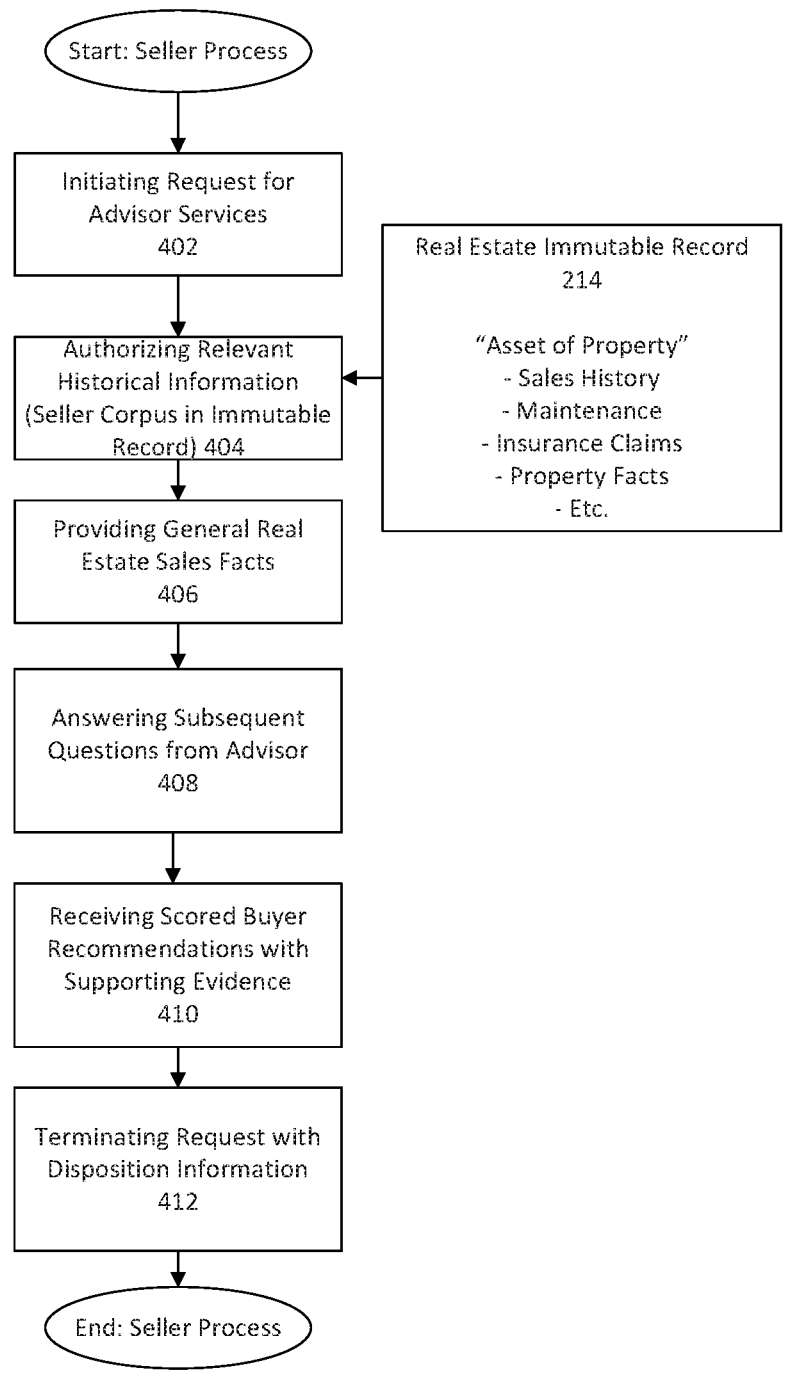
FIG. 4 illustrates a flow chart of one illustrative embodiment of a process of a seller.

FIG. 4 illustrates a flow chart of one illustrative embodiment of a process of the seller 108. As shown in FIG. 4, at step 402, the seller 108 initiates a request for real estate advisor engine 110 service, so that the seller 108 can get a list of matched buyer candidates. At step 404, the seller 108 authorizes the real estate advisor engine 110 to use historical information of the real estate property. The historical information is obtained from the real estate immutable record 214. In an embodiment, the historical information can be stored in a seller corpus, so that the real estate advisor engine 110 can obtain the historical information from the seller corpus. At step 406, the seller 108 provides real estate facts to the real estate advisor engine 110. In an embodiment, the real estate facts, e.g., the size of the property, the number of bedrooms, an annual tax, etc. are directly provided to the real estate advisor engine 110. The real estate facts may be information already included in the real estate immutable record 214, or may be information not included in the real estate immutable record 214. At step 408, the real estate advisor engine 110 raises questions to the seller 108, and the seller 108 answers the questions. In an embodiment, the questions can be raised to the seller 108 through text-to-speech technology. In another embodiment, the questions can be raised to the seller 108 through a user interface, or an email, etc. At step 410, the seller 108 receives a ranked list of buyer candidates with supporting evidence. Each buyer candidate in the ranked list is provided with a confidence score, and supporting evidence why this buyer candidate is selected. At step 412, the seller 108 terminates the request, and provides disposition information, i.e., decision or opinion regarding the buyer candidate to the real estate advisor engine 110. For example, the seller 108 may select one or more buyer candidates from the ranked list, and notify the real estate advisor engine 110 of the selection. For another example, the seller 108 may be unsatisfied with the ranked list, and thus request the real estate advisor engine 110 to update the result.

Figure 5:
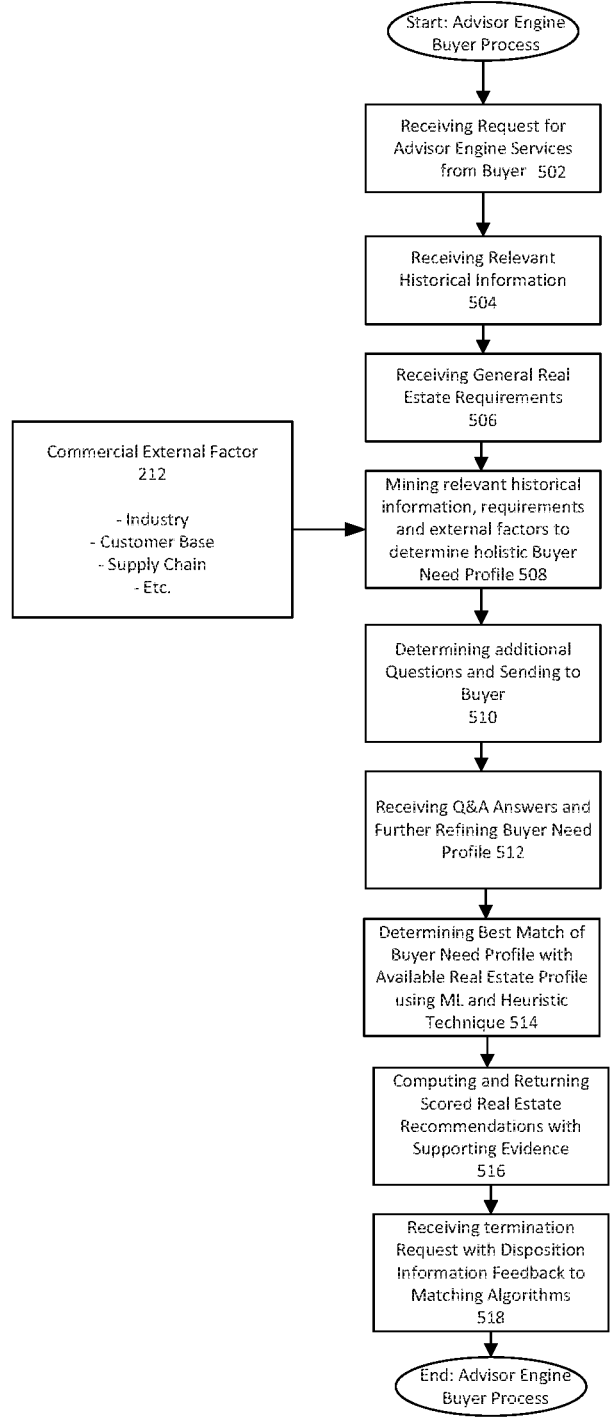
FIG. 5 illustrates a flow chart of one illustrative embodiment of a process of the real estate advisor engine in response to a service request from the buyer.

FIG. 5 illustrates a flow chart of one illustrative embodiment of a process of the real estate advisor engine 110 for the buyer 106. As shown in FIG. 5, at step 502, the real estate advisor engine 110 receives a request for service from the buyer 106, so that the buyer 106 can get a list of matched properties. At step 504, the real estate advisor engine 110 receives historical information from the buyer 106. The historical information is provided by the buyer immutable record 210. In an embodiment, the historical information can be stored in a buyer corpus, so that the real estate advisor engine 110 can obtain the historical information from the buyer corpus. The real estate advisor engine 110 is implemented on a cognitive system, which performs cognitive functions based on a corpus including the buyer corpus and the seller corpus. At step 506, the real estate advisor engine 110 receives real estate requirements from the buyer 106. In an embodiment, the real estate requirements, e.g., the size of the property, the number of bedrooms, a tax threshold, etc. are directly provided to the real estate advisor engine 110. In another embodiment, the real estate requirements can be provided through questions. For example, the buyer 106 raises the question "What home is my best choice for my relocation to Raleigh?" From the question, the real estate advisor engine 110 can extract location requirement "Raleigh." At step 508, in an embodiment, the buyer 106 is a commercial buyer, and the real estate advisor engine 110 receives the commercial external factors 212. The commercial external factors 212 may include industry, customer base, supply chain of the commercial buyer. The real estate advisor engine 110 then determines a holistic buyer need profile 218 based on the historical information, the real estate requirements, and the commercial external factors 212. In an embodiment, all the information received by the real estate advisor engine 110 are used to determine the buyer need profile 218 reciting reasonable requirements for the desired real estate property. At step 510, the real estate advisor engine 110 raises additional questions to the buyer 106 to get more information. In an embodiment, the questions can be raised to the buyer 106 through text-to-speech technology. In another embodiment, the questions can be raised to the buyer 106 through a user interface, or an email, etc. At step 512, the real estate advisor engine 110 receives answers from the buyer 106 and further refines the buyer need profile 218. For example, more information is added into the buyer need profile 218 based on the answers. At step 514, the real estate advisor engine 110 identifies a best match between the buyer need profile 218 and an available real estate profile using an existing heuristic technique and supervised machine learning techniques. At step 516, the real estate advisor engine 110 provides a ranked list of real estate properties with supporting evidence to the buyer 106. Each real estate property in the ranked list is provided with a confidence score, and supporting evidence why this property is selected. At step 518, the real estate advisor engine 110 receives a service termination request from the buyer 106, together with disposition information, i.e., decision or opinion regarding the properties to the real estate advisor engine 110. For example, the buyer 106 may select one or more properties from the ranked list, and notify the real estate advisor engine 110 of the selection. For another example, the buyer 106 may be unsatisfied with the ranked list, and thus request the real estate advisor engine 110 to update the result.

Figure 6:
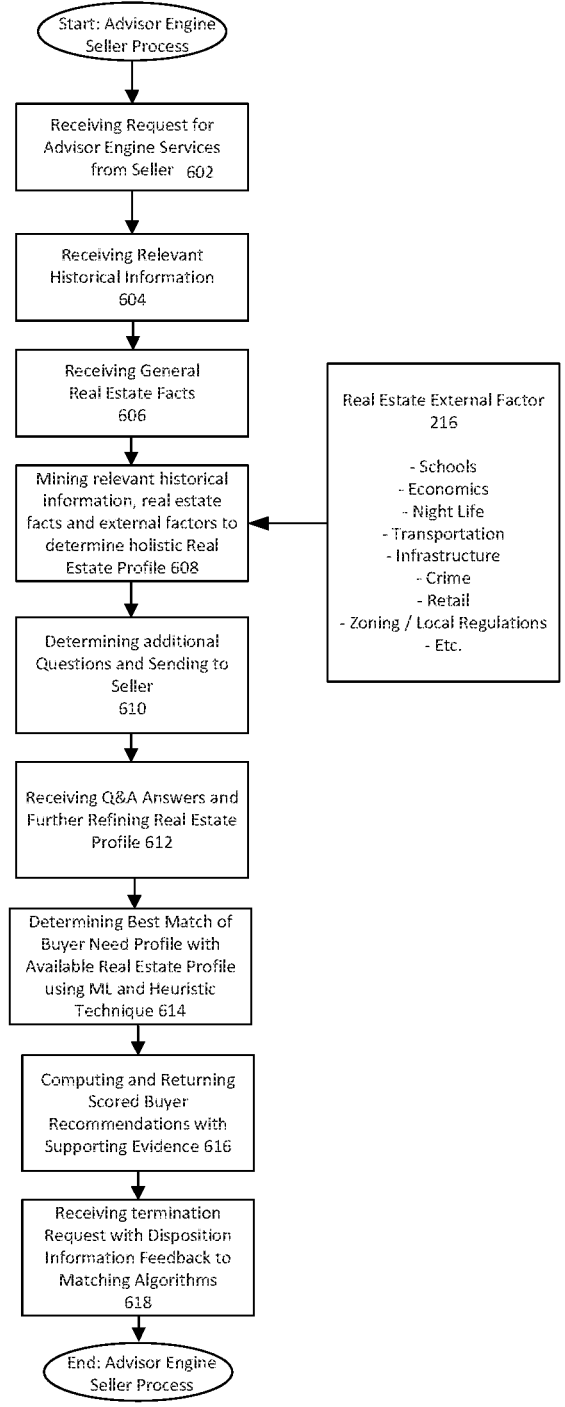
FIG. 6 illustrates a flow chart of one illustrative embodiment of a process of the real estate advisor engine in response to a service request from the seller.

FIG. 6 illustrates a flow chart of one illustrative embodiment of a process of the real estate advisor engine 110 for the seller 108. As shown in FIG. 6, at step 602, the real estate advisor engine 110 receives a request for service from the seller 108, so that the seller 108 can get a list of matched buyer candidates. At step 604, the real estate advisor engine 110 receives historical information from the seller 108. The historical information is provided by the real estate immutable record 214. In an embodiment, the historical information can be stored in a seller corpus, so that the real estate advisor engine 110 can obtain the historical information from the seller corpus. The real estate advisor engine 110 is implemented on a cognitive system, which performs cognitive functions based on a corpus including the buyer corpus and the seller corpus. At step 606, the real estate advisor engine 110 receives real estate property facts, e.g., the size of the property, the number of bedrooms, an annual tax, etc., from the seller 108. The real estate facts may be information already included in the real estate immutable record 214, or may be information not included in the real estate immutable record 214. At step 608, in an embodiment, the seller 108 receives the real estate external factors 216. The real estate external factors 216 may include a school, economics, night life, infrastructure, crime rate, retail, local regulations, etc. The real estate advisor engine 110 then determines a holistic real estate profile 220 based on the historical information, real estate facts, and the real estate external factors 216. In an embodiment, all the information received by the real estate advisor engine 110 are used to determine the real estate profile 220 reciting the complete real estate property information. At step 610, the real estate advisor engine 110 raises additional questions to the seller 108 to get more information. In an embodiment, the questions can be raised to seller 108 through text-to-speech technology. In another embodiment, the questions can be raised to seller 108 through a user interface, or an email, etc. At step 612, the real estate advisor engine 110 receives answers from the seller 108 and further refines the real estate profile 220. For example, more information is added into the real estate profile 220 based on the answers. At step 614, similarly to the step 514, the real estate advisor engine 110 identifies a best match between the buyer need profile 218 and the complete real estate profile 220 using an existing heuristic technique and supervised machine learning techniques. At step 616, the real estate advisor engine 110 provides a ranked list of buyer candidates with supporting evidence to the seller 108. Each buyer candidate in the ranked list is provided with a confidence score, and supporting evidence why this buyer candidate is selected. At step 618, the real estate advisor engine 110 receives a service termination request from the seller 108, together with disposition information, i.e., decision or opinion regarding the properties to the real estate advisor engine 110. For example, the seller 108 may select one or more buyer candidates from the ranked list, and notify the real estate advisor engine 110 of the selection. For another example, the seller 108 may be unsatisfied with the ranked list, and thus request the real estate advisor engine 110 to update the result.

Figure 7:
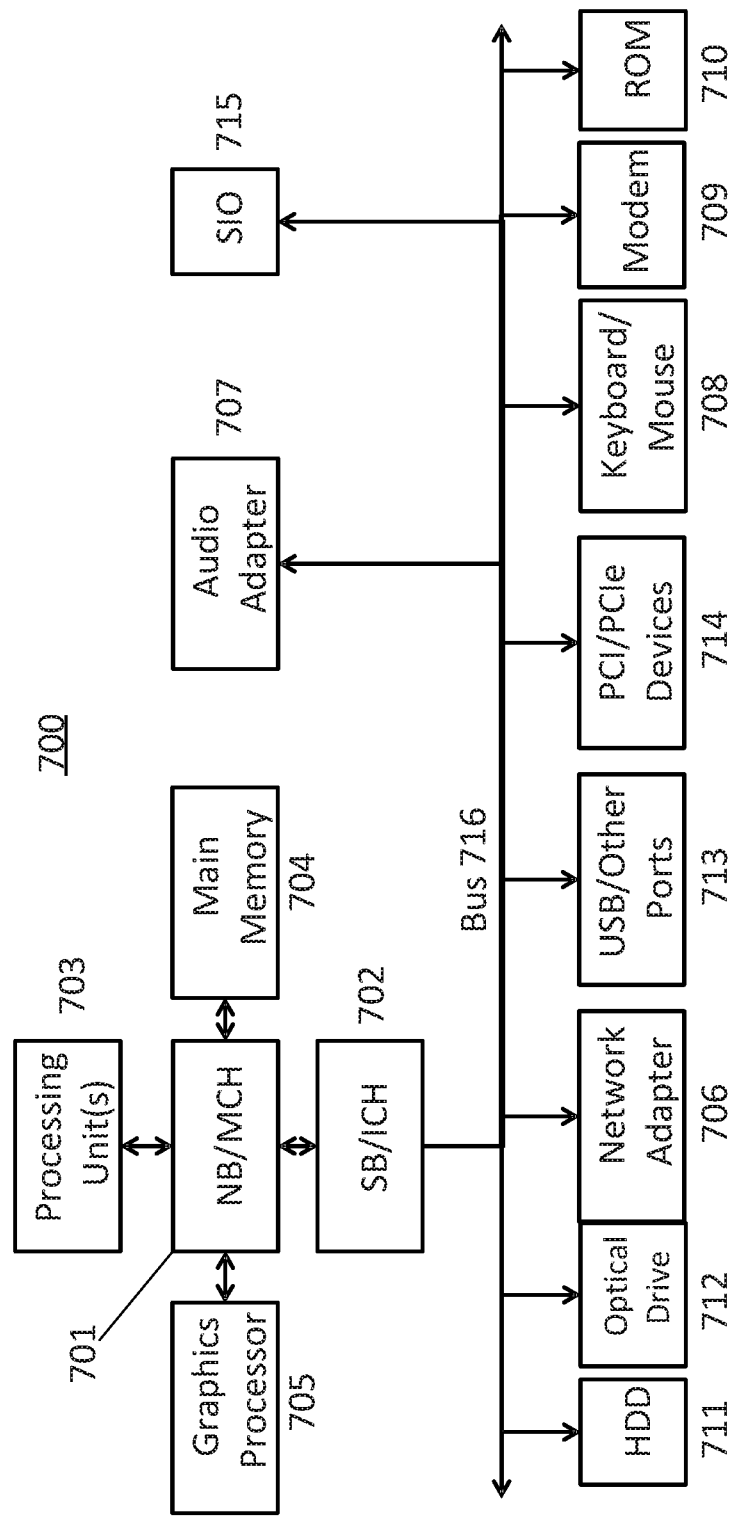
FIG. 7 is a block diagram of an example data processing system 700 in which aspects of the illustrative embodiments are implemented.

FIG. 7 is a block diagram of an example data processing system 700 in which aspects of the illustrative embodiments are implemented. Data processing system 700 is an example of a computer, such as a server or client, in which computer usable code or instructions implementing the process for illustrative embodiments of the present invention are located. In one embodiment, FIG. 7 represents a server computing device, such as a server, which implements the cognitive system 100 described herein.

In the depicted example, data processing system 700 can employ a hub architecture including a north bridge and memory controller hub (NB/MCH) 701 and south bridge and input/output (I/O) controller hub (SB/ICH) 702. Processing unit 703, main memory 704, and graphics processor 705 can be connected to the NB/MCH 701. Graphics processor 705 can be connected to the NB/MCH 701 through, for example, an accelerated graphics port (AGP).

In the depicted example, a network adapter 706 connects to the SB/ICH 702. An audio adapter 707, keyboard and mouse adapter 708, modem 709, read only memory (ROM) 710, hard disk drive (HDD) 711, optical drive (e.g., CD or DVD) 712, universal serial bus (USB) ports and other communication ports 713, and PCI/PCIe devices 714 may connect to the SB/ICH 702 through bus system 716. PCI/PCIe devices 714 may include Ethernet adapters, add-in cards, and PC cards for notebook computers. ROM 710 may be, for example, a flash basic input/output system (BIOS). The HDD 711 and optical drive 712 can use an integrated drive electronics (IDE) or serial advanced technology attachment (SATA) interface. A super I/O (SIO) device 715 can be connected to the SB/ICH 702.

An operating system can run on processing unit 703. The operating system can coordinate and provide control of various components within the data processing system 700. As a client, the operating system can be a commercially available operating system. An object-oriented programming system, such as the Java™ programming system, may run in conjunction with the operating system and provide calls to the operating system from the object-oriented programs or applications executing on the data processing system 700. As a server, the data processing system 700 can be an IBM® eServer™ System p® running the Advanced Interactive Executive operating system or the LINUX-® operating system. The data processing system 700 can be a symmetric multiprocessor (SMP) system that can include a plurality of processors in the processing unit 703. Alternatively, a single processor system may be employed.

Instructions for the operating system, the object-oriented programming system, and applications or programs are located on storage devices, such as the HDD 711, and are loaded into the main memory 704 for execution by the processing unit 703. The processes for embodiments of the real estate advisor engine 110, described herein, can be performed by the processing unit 703 using computer usable program code, which can be located in a memory such as, for example, main memory 704, ROM 710, or in one or more peripheral devices.

A bus system 716 can be comprised of one or more busses. The bus system 716 can be implemented using any type of communication fabric or architecture that can provide for a transfer of data between different components or devices attached to the fabric or architecture. A communication unit such as the modem 709 or the network adapter 706 can include one or more devices that can be used to transmit and receive data.

Those of ordinary skill in the art will appreciate that the hardware depicted in FIG. 7 may vary depending on the implementation. Other internal hardware or peripheral devices, such as flash memory, equivalent non-volatile memory, or optical disk drives may be used in addition to or in place of the hardware depicted. Moreover, the data processing system 700 can take the form of any of a number of different data processing systems, including but not limited to, client computing devices, server computing devices, tablet computers, laptop computers, telephone or other communication devices, personal digital assistants, and the like. Essentially, data processing system 700 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer implemented method in a data processing system comprising a processor and a memory comprising instructions, which are executed by the processor to cause the processor to implement the method for identifying a match between a commercial buyer and a seller for a real estate transaction, the method comprising:
    receiving, from the commercial buyer, a service request;
    receiving, from the commercial buyer, historical information stored in a buyer immutable record including one or more of revenue, expenses, bond rating, a market saturation level, sales volume, sold products, employee number, and certifications;
    receiving, from the commercial buyer, one or more real estate requirements;
    receiving, from the commercial buyer, one or more commercial external factors including one or more of an industry, a customer base, and a supply chain;
    determining, by the processor, a buyer need profile based on the historical information, the real estate requirements, and the commercial external factors;
    receiving, from the commercial buyer, one or more answers in response to one or more first questions raised by the processor;
    refining, by the processor, the buyer need profile based on the one or more answers;
    identifying, by the processor, a match between the buyer need profile and an available real estate profile from the seller, using a heuristic technique and a supervised machine learning technique, wherein the supervised machine learning technique includes one or more of linear regression, logistic regression, a multi-class classification, a decision tree, and a support vector machine; and
    providing, by the processor, a ranked list of real estate properties and supporting evidence for each real estate property to the commercial buyer.

2. The method as recited in claim 1, wherein the buyer immutable record is stored in a block chain.

3. The method as recited in claim 1, wherein the one or more real estate requirements are provided by the commercial buyer through one or more second questions.

4. The method as recited in claim 1, further comprising:
    receiving, from the seller, a second service request;
    receiving, from the seller, second historical information stored in a real estate immutable record;
    receiving, from the seller, one or more real estate property facts; and
    determining, by the processor, the real estate profile based on the second historical information and the one or more real estate property facts.

5. The method as recited in claim 4, further comprising:
    receiving, from the seller, one or more third answers in response to one or more third questions raised by the processor; and
    refining, by the processor, the real estate profile based on the one or more third answers.

6. The method as recited in claim 1, further comprising:
    receiving, from the commercial buyer, a service termination request and a selection of one or more real estate properties from the ranked list.

7. A computer program product for identifying a match between a commercial buyer and a seller for a real estate transaction, the computer program product comprising a computer readable storage medium having program instructions embodied therewith, the program instructions executable by a processor to cause the processor to:
    receive, from the commercial buyer, a service request;
    receive, from the commercial buyer, historical information stored in a buyer immutable record including one or more of revenue, expenses, bond rating, a market saturation level, sales volume, sold products, employee number, and certifications;
    receive, from the commercial buyer, one or more real estate requirements;
    receive, from the commercial buyer, one or more commercial external factors including one or more of an industry, a customer base, and a supply chain;
    determine a buyer need profile based on the historical information, the real estate requirements, and the commercial external factors;
    receive, from the commercial buyer, one or more answers in response to one or more first questions raised by the processor;
    refine the buyer need profile based on the one or more answers;
    identify a match between the buyer need profile and an available real estate profile from the seller, using a heuristic technique and a supervised machine learning technique, wherein the supervised machine learning technique includes one or more of linear regression, logistic regression, a multi-class classification, a decision tree, and a support vector machine; and provide a ranked list of real estate properties and supporting evidence for each real estate property to the commercial buyer.

8. The computer program product of claim 7, wherein the buyer immutable record is stored in a block chain.

9. The computer program product of claim 7, wherein the one or more real estate requirements are provided by the commercial buyer through one or more second questions.

10. The computer program product of claim 7, wherein the program instructions executable by the processor further cause the processor to:
   receive, from the seller, a second service request;
   receive, from the seller, second historical information stored in a real estate immutable record;
   receive, from the seller, one or more real estate property facts; and
   determine the real estate profile based on the second historical information and the one or more real estate property facts.

11. The computer program product of claim 10, wherein the program instructions executable by the processor further cause the processor to:
   receive, from the seller, one or more third answers in response to one or more third questions raised by the processor; and
   refine the real estate profile based on the one or more third answers.

12. The computer program product of claim 7, wherein the program instructions executable by the processor further cause the processor to:
   receive, from the commercial buyer, a service termination request and a selection of one or more real estate properties from the ranked list.

13. A system for identifying a match between a commercial buyer and a seller for a real estate transaction, the system comprising:
   a processor configured to:
      receive, from the commercial buyer, a service request;
      receive, from the commercial buyer, historical information stored in a buyer immutable record including one or more of revenue, expenses, bond rating, a market saturation level, sales volume, sold products, employee number, and certifications;
      receive, from the commercial buyer, one or more real estate requirements;
      receive, from the commercial buyer, one or more commercial external factors including one or more of an industry, a customer base, and a supply chain;
      determine a buyer need profile based on the historical information, the real estate requirements, and the commercial external factors;
      receive, from the commercial buyer, one or more answers in response to one or more first questions raised by the processor;
      refine the buyer need profile based on the one or more answers;
      identify a match between the buyer need profile and an available real estate profile from the seller, using a heuristic technique and a supervised machine learning technique, wherein the supervised machine learning technique includes one or more of linear regression, logistic regression, a multi-class classification, a decision tree, and a support vector machine; and
      provide a ranked list of real estate properties and supporting evidence for each real estate property to the commercial buyer.

14. The system of claim 13, wherein the buyer immutable record is stored in a block chain.

15. The system of claim 13, wherein the one or more real estate requirements are provided by the commercial buyer through one or more second questions.

16. The system of claim 13, wherein the processor is further configured to:
   receive, from the seller, a second service request;
   receive, from the seller, second historical information stored in a real estate immutable record;
   receive, from the seller, one or more real estate property facts; and
   determine the real estate profile based on the second historical information and the one or more real estate property facts.

17. The system of claim 16, wherein the processor is further configured to:
   receive, from the seller, one or more third answers in response to one or more third questions raised by the processor; and
   refine the real estate profile based on the one or more third answers.

18. The system of claim 13, wherein the processor is further configured to:
   receive, from the commercial buyer, a service termination request and a selection of one or more real estate properties from the ranked list.

* * * * *